US008654705B2

(12) United States Patent
Wang et al.

(10) Patent No.: US 8,654,705 B2
(45) Date of Patent: Feb. 18, 2014

(54) SYSTEM AND METHOD FOR SUPPORTING MULTIPLE REVERSE LINK DATA STREAMS

(75) Inventors: Jibing Wang, San Diego, CA (US); Tamer Kadous, San Diego, CA (US); Rashid Ahmed Akbar Attar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 791 days.

(21) Appl. No.: 12/754,018

(22) Filed: Apr. 5, 2010

(65) Prior Publication Data

US 2010/0291917 A1 Nov. 18, 2010

Related U.S. Application Data

(63) Continuation-in-part of application No. 12/582,514, filed on Oct. 20, 2009.

(60) Provisional application No. 61/167,118, filed on Apr. 6, 2009, provisional application No. 61/186,124, filed on Jun. 11, 2009, provisional application No. 61/108,352, filed on Oct. 24, 2008.

(51) Int. Cl.
*H04W 52/04* (2009.01)

(52) U.S. Cl.
USPC .......................................... 370/328

(58) Field of Classification Search
USPC ......... 370/318, 338, 331, 208, 334, 473, 312, 370/328–329; 455/101, 522, 562.1; 375/299, 260
See application file for complete search history.

(56) References Cited

U.S. PATENT DOCUMENTS 6,771,989 B1 * 8/2004 Katz et al. .................. 455/562.1
7,062,232 B2   6/2006 Coan et al.
8,072,915 B1 * 12/2011 Gutierrez et al. ............. 370/318
(Continued)

FOREIGN PATENT DOCUMENTS

JP    2003258770 A    9/2003
JP    2004104206 A    4/2004
(Continued)

OTHER PUBLICATIONS

Astely D, et al., "LTE: the evolution of mobile broadband" IEEE Communications Magazine, IEEE Service Center, Piscataway, US, vol. 47, No. 4, Apr. 1, 2009, pp. 44-51, XP011281212 ISSN: 0163-6804 DOI: DOI:10.1109/MCOM.2009.4907406 the whole document.

(Continued)

*Primary Examiner* — Kwang B Yao
*Assistant Examiner* — Syed M Bokhari
(74) *Attorney, Agent, or Firm* — Jeffrey D. Jacobs

(57) ABSTRACT

Techniques for rank adaptation and multiple-stream reverse link communications in a wireless access network are disclosed. A remote unit transmits one or more reverse link data streams using separate identifiers to a base station. The number of reverse link data streams may be determined according to feedback from the base station or it may be determined by testing one or more multiple-antenna transmit hypotheses. The base station may estimate channel conditions using information obtained from the one or more reverse link data streams and may determine a spatial rank of the communication channel. The remote unit may perform separate error control and power control processes for each reverse link data stream in cooperation with the base station.

35 Claims, 9 Drawing Sheets

(56) References Cited

U.S. PATENT DOCUMENTS

| | | | |
|---|---|---|---|
| 8,213,539 B2* | 7/2012 | Zhang et al. | 375/299 |
| 2002/0122400 A1* | 9/2002 | Vayanos et al. | 370/338 |
| 2004/0014434 A1 | 1/2004 | Haardt | |
| 2004/0029579 A1 | 2/2004 | Kashiwase | |
| 2004/0185782 A1 | 9/2004 | Halford et al. | |
| 2005/0181739 A1 | 8/2005 | Krasny et al. | |
| 2006/0250941 A1* | 11/2006 | Onggosanusi et al. | 370/208 |
| 2007/0049218 A1 | 3/2007 | Gorokhov et al. | |
| 2007/0142074 A1* | 6/2007 | Black et al. | 455/522 |
| 2007/0195908 A1 | 8/2007 | Attar et al. | |
| 2007/0223423 A1* | 9/2007 | Kim et al. | 370/334 |
| 2007/0242766 A1* | 10/2007 | Xu et al. | 375/260 |
| 2007/0249296 A1* | 10/2007 | Howard et al. | 455/101 |
| 2008/0062925 A1* | 3/2008 | Mate et al. | 370/331 |
| 2008/0227414 A1 | 9/2008 | Karmi et al. | |
| 2008/0232403 A1* | 9/2008 | Tsai et al. | 370/473 |
| 2008/0240031 A1 | 10/2008 | Nassiri-Toussi et al. | |
| 2008/0260002 A1 | 10/2008 | Zhang et al. | |
| 2008/0267108 A1 | 10/2008 | Zhang et al. | |
| 2010/0080178 A1 | 4/2010 | Cox et al. | |
| 2010/0103877 A1 | 4/2010 | Wang et al. | |
| 2010/0316154 A1 | 12/2010 | Park et al. | |

FOREIGN PATENT DOCUMENTS

| | | |
|---|---|---|
| JP | 2007129752 A | 5/2007 |
| WO | 0077948 A1 | 12/2000 |
| WO | WO03034614 A1 | 4/2003 |
| WO | WO2004023674 A1 | 3/2004 |
| WO | WO2008011320 A2 | 1/2008 |
| WO | WO2009031846 A1 | 3/2009 |

OTHER PUBLICATIONS

International Search Report and Written Opinion—PCT/US2010/030040—International Search Authority, European Patent Office,Jan. 26, 2011.

Magnolia Broadband, "Mobile Transmit Diversity", Aug. 4, 2009, 14 pages.

"International Search Report and Written Opinion—PCT/US2009/061918, International Search Authority—European Patent Office—Dec. 16, 2010".

Taiwan Search Report—TW099110600—TIPO—Apr. 21, 2013.

\* cited by examiner

SYSTEM AND METHOD FOR SUPPORTING MULTIPLE REVERSE LINK DATA STREAMS

CROSS-REFERENCE TO RELATED APPLICATIONS

The present application claims the benefit of U.S. Provisional Application No. 61/167,118 entitled "RL MIMO for EV-DO," filed Apr. 6, 2009, and claims the benefit of, and is a continuation-in-part of, application Ser. No. 12/582,514 entitled "Systems and Methods Providing Mobile Transmit Diversity," filed Oct. 20, 2009 which claims the benefit of U.S. Provisional Application No. 61/186,124 entitled "Mobile Transmit Diversity for EVDO," filed Jun. 11, 2009, and U.S. Provisional Application No. 61/108,352 entitled "Mobile Transmit Diversity for EVDO," filed Oct. 24, 2008, all of which applications are assigned to the assignee hereof and expressly incorporated by reference herein.

BACKGROUND

In a wireless communication system, a transmitter may use multiple transmit antennas for data transmission. Receivers in the wireless communication system may have different capabilities for receiving the data transmission. Conditions for communicating with the receivers may change such that one type of communication is more suitable than another in a given time and place. Notwithstanding differences in conditions and capabilities, the transmitter should be able to communicate with different receivers according to their particular circumstances.

BRIEF SUMMARY

Techniques for rank adaptation and multiple-stream reverse link communications in a wireless access network are disclosed. A remote unit transmits one or more reverse link data streams using separate identifiers to a base station. The number of reverse link data streams may be determined according to feedback from the base station or it may be determined by testing one or more multiple-antenna transmit hypotheses. The base station may estimate channel conditions using information obtained from the one or more reverse link data streams and may determine a spatial rank of the communication channel. The remote unit may perform separate error control and power control processes for each reverse link data stream in cooperation with the base station.

A method for use by an access terminal in an Evolution Data Optimized (EV-DO) network is disclosed. The method includes determining a number of reverse link data streams to transmit and determining a selection of antennas from a plurality of antennas for transmitting the reverse link data streams. The number of reverse link data streams to transmit can be based on feedback from a base station, or it can involve testing different multiple-antenna hypotheses absent specific guidance from the base station. The method also includes transmitting a first data stream comprising a first medium access control (MAC) index using the selection of antennas and concurrently transmitting a second data stream comprising a second MAC index when the number of reverse link data streams is at least two.

An EV-DO enabled access terminal is also disclosed. The access terminal may include means for determining a number of reverse link data streams to transmit and means for determining a selection of antennas from a plurality of antennas for transmitting the reverse link data streams. The access terminal also includes means for transmitting a first data stream comprising a first medium access control (MAC) index using the selection of antennas and concurrently transmitting a second data stream comprising a second MAC index responsive to determining that the number of reverse link data streams is at least two.

An EV-DO enabled access terminal having a plurality of antennas and a plurality of transceivers is disclosed. Each transceiver is coupled to a corresponding antenna in the plurality of antennas. The access terminal also includes a controller that is coupled to the transceivers. The controller determines a number of reverse link data streams to transmit and a selection of antennas from the plurality of antennas for transmitting the reverse link data streams. The number of reverse link data streams to transmit can be based on feedback received from a base station. The controller can also determine the number of reverse link data streams to transmit based on a result of testing one or more multiple-antenna hypotheses absent specific guidance from the base station. The controller causes a first data stream comprising a first medium access control (MAC) index to be transmitted using the selection of antennas and a second data stream comprising a second MAC index to be transmitted concurrently therewith in response to determining that the number of reverse link data streams is at least two.

A computer program product comprising a processor-readable medium storing processor-readable instructions for use with an access terminal in an EV-DO network is disclosed. The instructions are configured to cause a processor to determine a number of reverse link data streams to transmit and to determine a selection of antennas from a plurality of antennas for transmitting the reverse link data streams. The instructions are also configured to cause the access terminal to transmit a first data stream comprising a first medium access control (MAC) index using the selection of antennas and to concurrently transmit a second data stream comprising a second MAC index when the number of reverse link data streams is at least two.

A method for use by a base station in an EV-DO network is disclosed. The method includes estimating channel conditions for communicating with an access terminal and determining a spatial rank of the access terminal based on the estimated channel conditions. The spatial rank of the access terminal corresponds to a number of data streams the access terminal may transmit on a reverse link of the EV-DO network. The method also includes assigning a separate Medium Access Control (MAC) index to the access terminal for each of the number of data streams and sending power control signals using each assigned MAC index in response to data streams transmitted by the access terminal.

An EV-DO base station is disclosed. The base station comprises a plurality of antenna means, means for estimating channel conditions for communicating with an access terminal, and means for determining a spatial rank of the access terminal based on the estimated channel conditions. The base station also comprises means for determining a plurality of steering vectors for use by the access terminal when transmitting on a reverse link of the EV-DO network, each steering vector including beamforming parameters adapted to the estimated channel conditions. The base station includes means for transmitting to the access terminal information relating to the spatial rank and the plurality of steering vectors with one or more Medium Access Control (MAC) indices assigned for use by the access terminal.

An EV-DO base station having a plurality of antennas is disclosed. The base station comprises a channel module configured to estimate channel conditions for communicating with an access terminal and to determine a spatial rank of the access terminal based on the estimated channel conditions. The base station also includes a beamforming module configured to determine a plurality of steering vectors for use by the access terminal when transmitting on a reverse link of the EV-DO network, the plurality of steering vectors comprising beamforming parameters adapted to the estimated channel conditions. The base station also includes a feedback module configured to transmit to the access terminal information relating to the spatial rank and the plurality of steering vectors with one or more Medium Access Control (MAC) indices assigned for use by the access terminal.

A computer program product comprising a processor-readable medium storing processor-readable instructions for use with a base station in an EV-DO network is disclosed. The instructions are configured to cause a processor to estimate channel conditions for communicating with an access terminal and to determine a spatial rank of the access terminal based on the estimated channel conditions. The spatial rank of the access terminal corresponds to a number of data streams the access terminal may transmit on a reverse link of the EV-DO network. The instructions are configured to cause the processor to assign a separate Medium Access Control (MAC) index to the access terminal for each of the number of data streams and to send power control signals using each assigned MAC index in response to data streams transmitted by the access terminal.

In the figures, similar components and/or features may have the same reference label. Similar components may be identified using a first reference label followed by a dash and a second reference label that distinguishes among the similar components. If only the first reference label is used, the description is applicable to any of the similar components designated by the first reference label.

DETAILED DESCRIPTION

Figure 1:
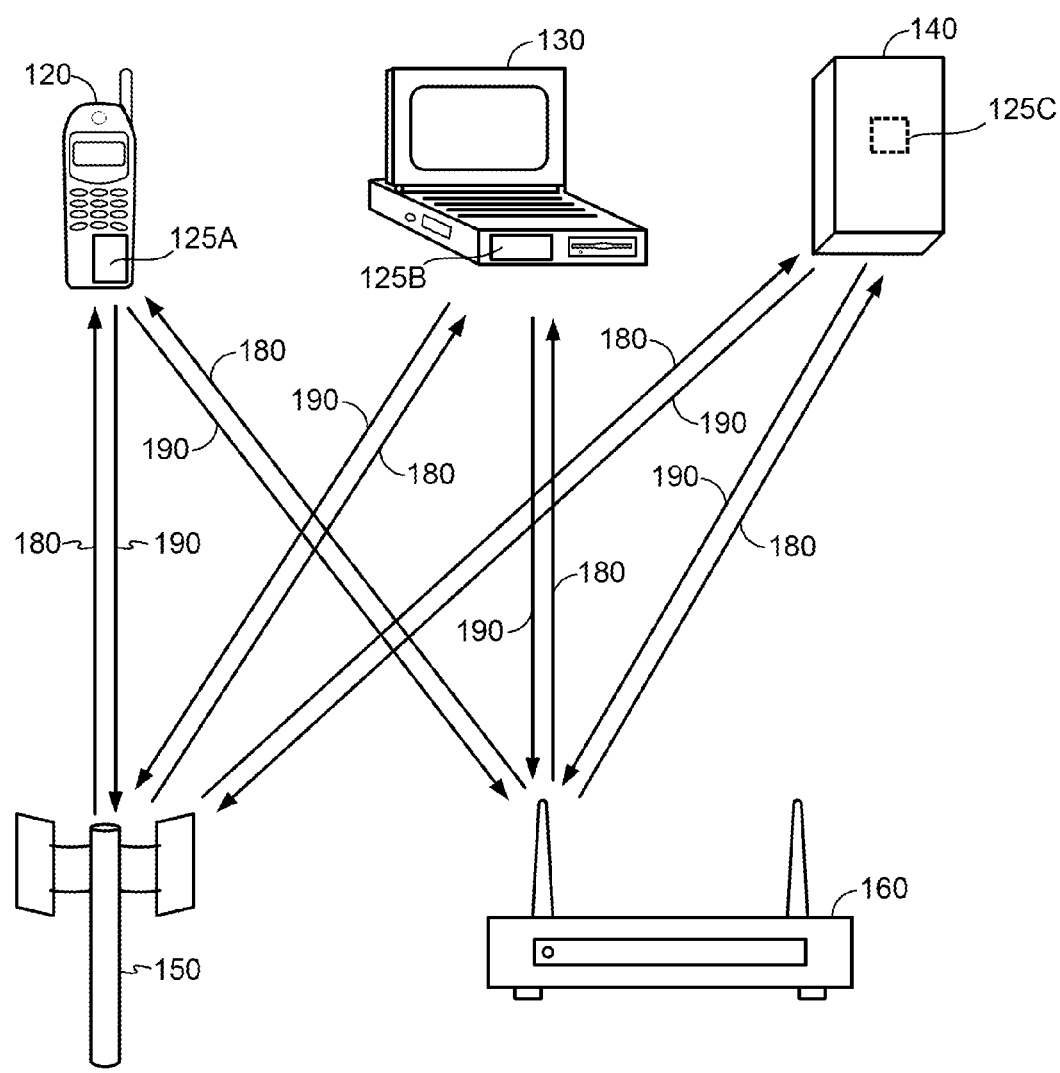
FIG. 1 shows a block diagram of a wireless communication system.

FIG. 1 shows an exemplary wireless communication system 100 including three remote units (also "access terminals") 120, 130, and 140 and two base stations 150, 160. Base stations 150, 160 are part of an access network (AN) through which remote units 120, 130, 140 may receive voice and data services. For purposes of discussion, only a small number of devices is shown. However, wireless communication systems 100 may have many more remote units and base stations.

Remote units 120, 130, and 140 include semiconductor processor devices 125A, 125B, and 125C, respectively, which in various embodiments provide functionality for multiple-input, multiple-output (MIMO) data transmission including antenna selection, beamforming, power control, error correction, etc. The operations described herein may be implemented using executable code stored to a computer-readable medium integral to, or separate from, the processor devices 125A, 125B, and 125C. The code may include instructions configured to cause a processor 125 to perform functions as described when the processor executes the instructions directly or indirectly.

The remote units may include mobile devices, such as cell phones, hand-held personal communication systems (PCS) devices, and/or portable data units such as personal data assistants, notebooks, netbooks, and the like. The remote units may also include fixed location data units. Here, remote unit 120 is a mobile telephone, remote unit 130 is a portable computer, and remote unit 140 is a computer in a wireless local loop system. Although FIG. 1 illustrates remote units according to the teachings of the disclosure, the disclosure is not limited to these exemplary illustrated units. The disclosure may be suitably employed using any device which includes multiple antennas.

FIG. 1 also shows forward link (FL) signals 180 from the base stations 150, 160 to remote units 120, 130, and 140 and reverse link (RL) signals 190 from the remote units 120, 130, and 140 to base stations 150, 160. In one example, system 100 is an EV-DO network, in which the forward link is time multiplexed, and the reverse link is code division multiplexed. Some transmissions on the reverse link include pilot signals to help in decoding, and some forward link transmissions include feedback used by the remote units to improve communication as described herein.

Although the examples below specifically refer to base stations and remote units in an EV-DO network, the scope of embodiments is not so limited. For instance, many of the features described herein are adaptable for use in systems other than EV-DO systems, such as systems using High Speed Packet Access (HSPA), Universal Mobile Telecommunications Systems (UMTS), Enhanced Data rates for GSM Evolution (EDGE), Long Term Evolution (LTE), and the like.

Figure 2:
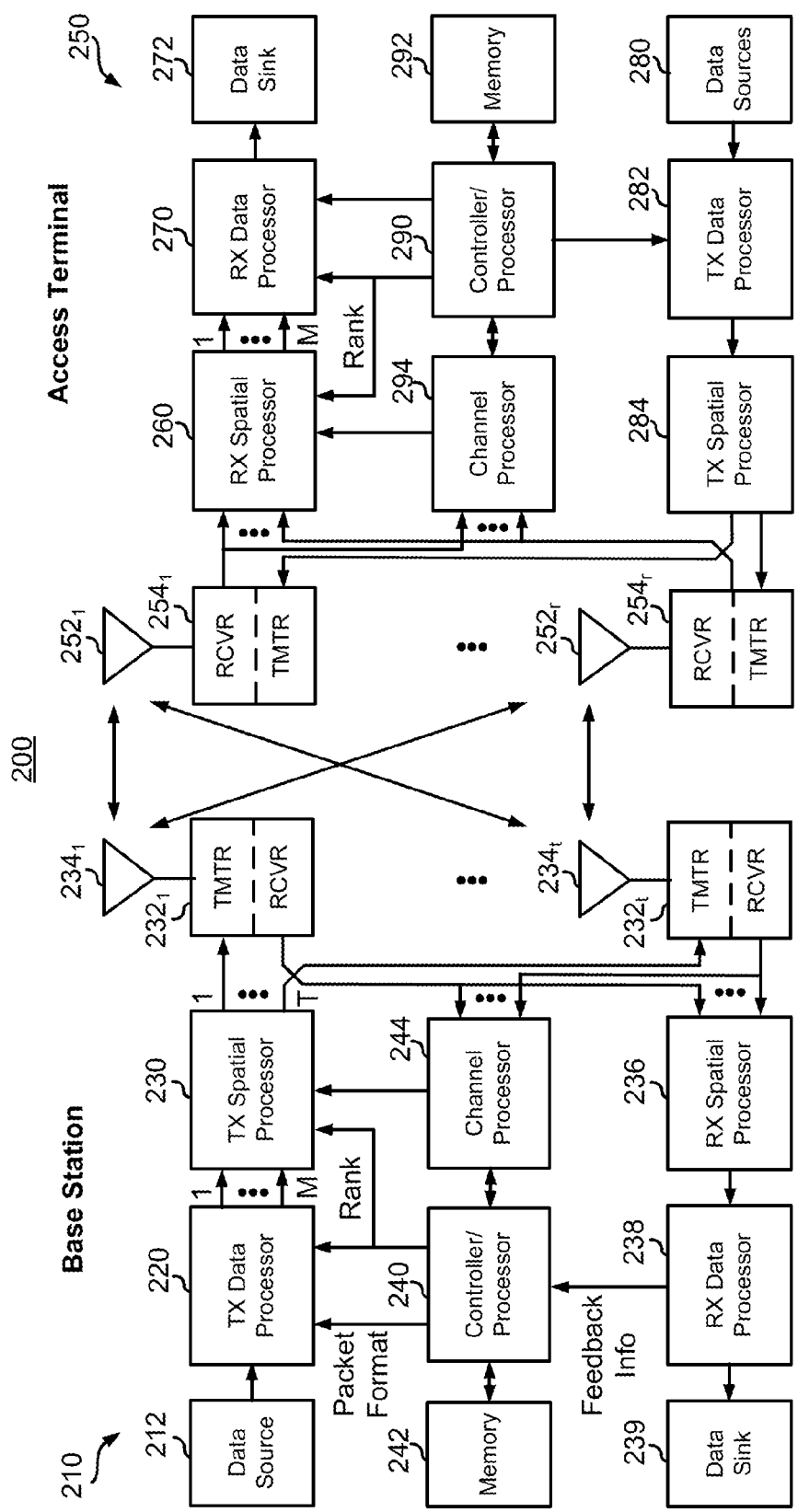
FIG. 2 shows a block diagram of a base station and an access terminal.

FIG. 2 shows an exemplary system 200 including an access terminal 250 and a base station 210. Base station 210 is equipped with multiple (T) antennas $234_1$ through $234_t$, each of which is coupled to a corresponding transceiver 232 for data transmission on the forward link and data reception on the reverse link. Access terminal 250 is also equipped with multiple (R) antennas $252_1$ through $252_r$, coupled to transceivers 254 for data reception on the forward link and data transmission on the reverse link. Each antenna 234, 252 may be a physical antenna or an antenna array.

On the forward link, at base station 210, a transmit (TX) data processor 220 receives traffic data from a data source 212, processes (e.g., formats, encodes, interleaves, and symbol maps) the traffic data in accordance with a packet format, and generates data symbols. As used herein, symbols typically have complex values. A data symbol is a symbol for data, and a pilot symbol is a symbol for pilot. Pilots include data that is known a priori by both a transmitter and a receiver. A packet format may indicate a data rate, a coding scheme or code rate, a modulation scheme, a packet size, and/or other parameters. TX data processor 220 demultiplexes the data symbols into M streams, where $1 \leq M \leq T$, as determined by a controller/processor 240. The M data symbol streams may also be referred to as data streams, spatial streams, output streams, or other terminology.

A TX spatial processor 230 multiplexes pilot symbols with the data symbols, performs beamforming on the multiplexed data and pilot symbols, and provides T output symbol streams to T transmitters (TMTR) 232. Each transmitter 232 processes (e.g., modulates, converts to analog, filters, amplifies, and upconverts) its output symbol stream and generates a forward link signal. T forward link signals from transmitters $232_1$ through $232_t$ are transmitted from antennas $234_1$ through $234_t$, respectively.

At access terminal 250, R antennas $252_1$ through $252_r$, receive the T forward link signals, and each antenna 252 provides a received signal to a respective receiver (RCVR) 254. Each receiver 254 processes (e.g., filters, amplifies, downconverts, digitizes, and demodulates) its received signal, provides received data symbols to a receive (RX) spatial processor 260, and provides received pilot symbols to a channel processor 294. Channel processor 294 estimates the forward link channel response based on the received pilot symbols and provides channel estimates to RX spatial processor 260. RX spatial processor 260 may perform MIMO detection on the received data symbols using the channel estimates and provide data symbol estimates. An RX data processor 270 further processes (e.g., deinterleaves and decodes) the data symbol estimates and provides decoded data to a data sink 272.

Access terminal 250 may transmit one or more data streams concurrently on the reverse link as determined by channel conditions. In an RL-MIMO operating mode, access terminal 250 may be assigned at least two identifiers by base station 210. The identifiers may be used by the AN to associate separate RL data streams with the access terminal 250. For instance, in EV-DO networks, the identifiers can be Medium Access Control (MAC) indices corresponding to forward link signals. Access terminal 250 may also operate in a single-stream transmit diversity mode. In that case, a single data stream is transmitted on the reverse link using, for example, a pair of antennas 252. The operating mode of access terminal 250 may change based on channel conditions as described in more detail below.

Open-loop or closed-loop control mechanisms can be used with the RL-MIMO and single-stream transmit diversity modes. With open-loop control, access terminal 250 can determine the number of reverse link data streams to transmit, as well as antenna selection or beamforming parameters for use in transmitting the number of reverse link data streams without explicit guidance from base station 210. The access terminal 250 may test various hypotheses regarding multiple antenna usage for transmitting on the reverse link and select a hypothesis that meets one or more predetermined criteria. Such predetermined criteria may include reducing transmit power on the reverse link or reducing error rates.

With closed-loop control, on the other hand, access terminal 250 and base station 210 cooperate to determine antenna selection or beamforming parameters based on channel conditions. Access terminal 250 may transmit two or more pilots at the same power level and base station 210 may estimate channel conditions based on information obtained from the pilots. Base station 210 may send steering vectors or codebook information to access terminal 250 to assist with antenna selection and/or beamforming for reverse link transmissions. Steering vectors and/or a codebook may be stored in memory 292 with instructions which, when executed by controller/processor 290, may be used to carry out the operations described herein.

Controller/processor 290 of the access terminal directs a TX data processor 282 to transmit one or more data streams from data sources 280. TX data processor 282 processes data symbols for each data stream and multiplexes them with pilot symbols. TX spatial processor 284 further processes the multiplexed streams to generate one or more reverse link signals. TX spatial processor 284 delivers the RL signals to transmitters 254 associated with the selection of antennas 252 where they are transmitted with a weight and phase determined by the beamforming parameters. A memory 292 is coupled to controller/processor 290 and stores data and program instructions which, when executed by controller/processor 290, cause access terminal 250 to carry out the operations described herein.

At base station 210, the RL signals are received by antennas 234, processed by receivers (RCVRS) 232, spatially processed by an RX spatial processor 236, and further processed by an RX data processor 238 to recover feedback information and traffic data sent by access terminal 250. With EV-DO networks, for example, feedback information may include a reverse rate indicator (RRI) specifying a data rate of the corresponding reverse link data stream, as well as acknowledgements from H-ARQ (hybrid automatic repeat request) processes and DRC (data rate control) information. Traffic data recovered from the RL signals is delivered to a data sink 239. Data sink 239 can be coupled to the AN at which the separate data streams from access terminal 250 may be combined in connection with providing network services.

Controller/processor 240 controls data transmission to access terminal 250. In a closed-loop mode, controller/processor 240 may determine a spatial rank of the channel and appropriate antenna selection or beamforming parameters for communicating with access terminal 250 based on prevailing conditions. The spatial rank S defines the number of RL data streams that access terminal 250 may transmit concurrently on the reverse link and may be given as $S \leq \min(T, R)$. For example, if base station 210 has sixteen antennas (T=16) and access terminal 250 has two antennas (R=2), then the maximum number of data streams which access terminal 250 could transmit concurrently is two.

Channel processor 244 estimates channel conditions based on RL transmissions from access terminal 250. In one embodiment, at least one of the RL signals from access terminal 250 includes orthogonal primary and secondary pilots. Channel processor 244 may estimate channel conditions based on information obtained from the pilots and, for example, may generate a channel response matrix. Controller/processor 240 determines a spatial rank of the access terminal 250 based on information from channel processor 244. In closed-loop mode, controller/processor 240 may also calculate steering vectors for use by the access terminal or select entries from a codebook corresponding to predetermined steering vectors.

Controller/processor 240 may communicate information relating to the spatial rank and/or steering vectors to access terminal 250 in one or more forward link signals. With EV-DO networks, distinct MAC indices can be assigned for use by the access terminal 250 in RL-MIMO mode and each MAC index may be used to transmit a separate reverse link data stream. Using the corresponding MAC indices, base station 210 can send beamforming and antenna selection information to access terminal 250 for RL transmissions and can separately control a transmit power level of each RL data stream. A memory 242 is coupled to controller/processor 240 and may store data and program instructions which, when executed by controller/processor 240, cause base station 210 to carry out the operations described herein.

Figure 3:
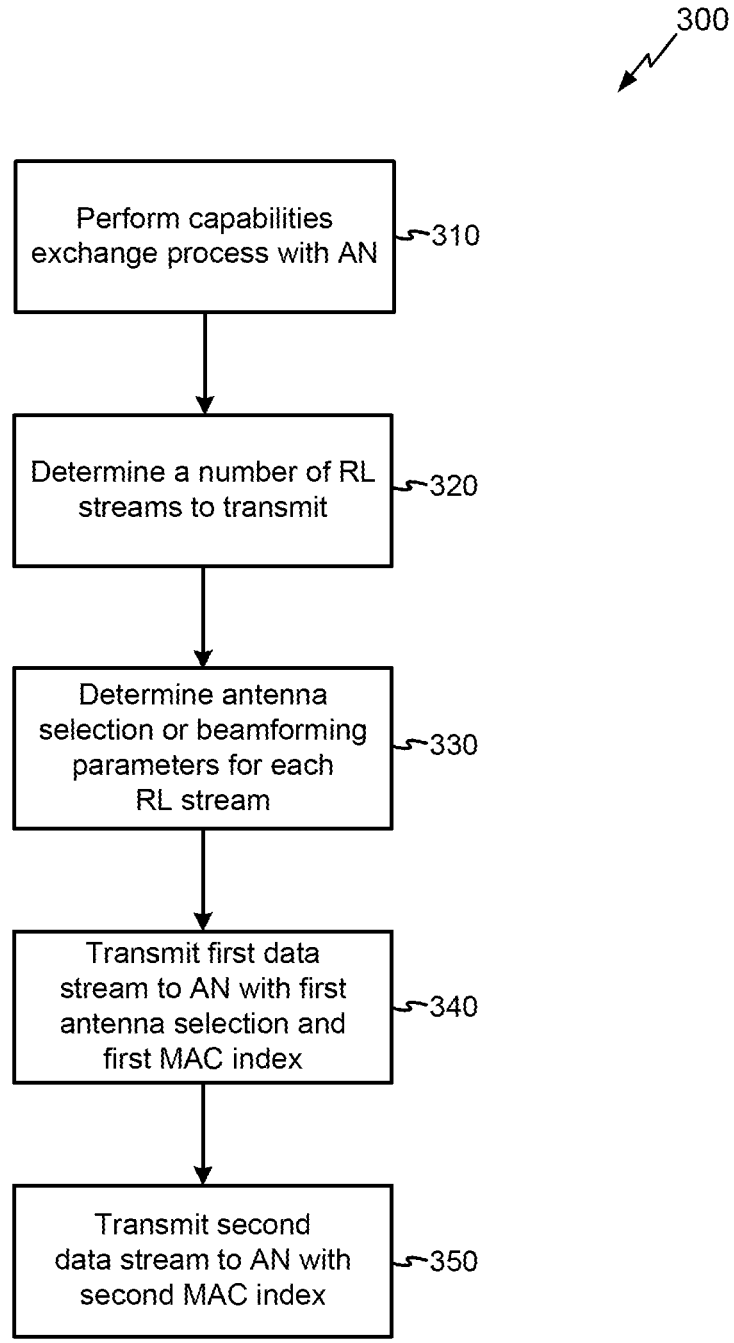
FIG. 3 shows a process for reverse link MIMO data transmission.

FIG. 3 shows an exemplary process 300 for antenna selection and beamforming in an open-loop system. Process 300 may be performed, for example, by an access terminal, such as access terminal 250 (FIG. 2).

At block 310, the access terminal performs a capabilities exchange process with the access network. This can occur, for example, when the access terminal (AT) is powered on or when it enters into the coverage area of a base station. The AT may communicate its device capabilities to the base station, including whether it supports RL-MIMO and/or single-stream diversity transmit modes. Based on the device capabilities, the AN may assign one or more identifiers for use by the access terminal when sending and receiving RL data streams. For instance, with an EV-DO network, two MAC indices may automatically be assigned for use by an AT which supports RL-MIMO or single-stream diversity. Alternatively, a single MAC index may be assigned pending a spatial rank determination.

At blocks 320-330, the access terminal determines a number of RL streams to transmit and corresponding beamforming or antenna selection parameters. When operating in open-loop mode, the AT may test different transmit hypotheses to determine the number of RL streams to transmit. For example, the AT may hypothesize that channel conditions support RL-MIMO and may determine beamforming parameters for transmitting two (or more) RL data streams. The AT may thereafter adjust beamforming parameters used with its RL-MIMO hypothesis, or it may transition from RL-MIMO to a single-stream diversity mode when it determines that the number of RL streams is one. Adjustment of the beamforming parameters and/or the number of RL data streams to transmit may be based on indirect feedback from the access network. Examples of such indirect feedback may include the transmit power level for a hypothesis under test and/or the number of re-transmissions.

As an example, in EV-DO networks, a base station sends power control messages for increasing or decreasing RL transmit power to each AT with an open connection. The base station also acknowledges to the AT when reverse link data transmissions are successfully decoded or need to be retransmitted. With open-loop control, the AT can monitor the number of power control and/or retransmission messages and adjust its antenna selection or beamforming in relation to a predetermined threshold, an observed average, or some other measure. For example, in MIMO mode, if the power required to successfully transmit two data streams exceeds a predetermined value, the AT may change its antenna selection or beamforming parameters. If the situation persists, the AT may discontinue transmitting one of the RL data streams and fall back to single-stream diversity mode.

Alternatively, in a closed-loop mode, the AT determines the number of RL streams to transmit based on feedback from the AN relating to a spatial rank of the channel. For example, if feedback from the AN indicates that the spatial rank is two, then the access terminal may enter RL-MIMO mode in which it transmits two reverse link data streams concurrently. On the other hand, if feedback from the AN indicates a lower spatial rank, the access terminal may transmit only one RL data stream in a single-stream diversity mode, or one RL data stream in a single-antenna mode.

At block 340, using a first MAC index, the AT transmits a first RL data stream to the access network. The first data stream may include a primary pilot and a secondary pilot multiplexed with traffic data as previously discussed. The primary pilot and the secondary pilot may be orthogonal and may provide information to assist the base station in estimating channel conditions and providing spatial rank feedback as needed. The various pilots can be sent with different long code masks, with different Walsh codes, or with different orthogonal spreading.

At block 350, in MIMO mode, the AT transmits a second RL data stream on the reverse link using a second MAC index. The second RL data stream (and possibly additional RL data streams) may be transmitted concurrently with the first RL data stream. The number of RL data streams transmitted by the access terminal may vary according to the spatial rank or the results of testing different transmit hypotheses; each RL data stream may be separately controlled by the access network and each may have its own power level, data rate, error control process, etc.

Figure 4A:
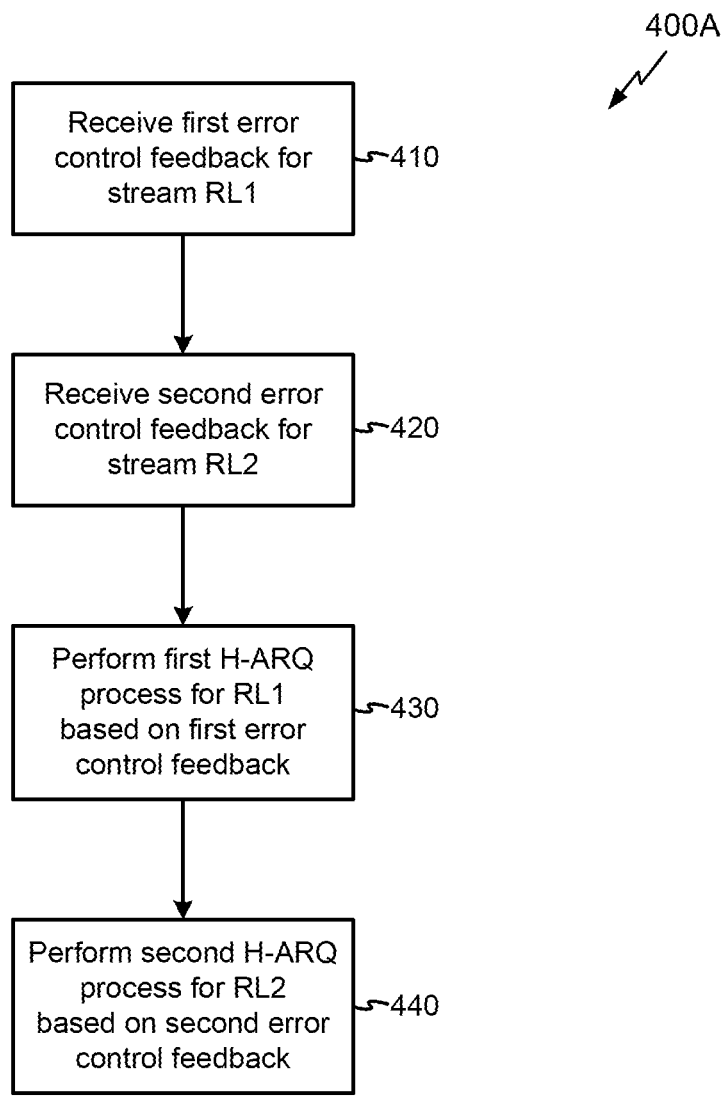
FIG. 4A shows an exemplary error control process.

FIG. 4A shows an exemplary error control process 400A such as may be used with reverse link MIMO data transmission. Process 400A can be performed, for example, by an access terminal, such as access terminal 250 (FIG. 2).

In reverse link MIMO mode, for example, two MAC indices M1, M2 may be assigned for use by the AT. The MAC indices may serve to identify data streams as belonging to the AT and may be assigned for use by the AT according to a spatial rank of the communication channel. In some embodiments, MAC index values may be reused by other ATs in the access network. For instance, the AN may schedule access terminals to expect feedback relating to their respective RL transmissions in particular timeslots of a FL signal so that a same MAC index can be used with different ATs in different timeslots.

Error control for the RL data streams may be implemented using a hybrid automatic repeat request (H-ARQ) process. At block 410, the AT receives first error control feedback from the base station relating to a first RL data stream (RL1). The error control feedback may include an ACK message indicating that data transmitted on RL1 was successfully decoded, a NACK message indicating the RL1 data was not successfully decoded, or some other message relating to the RL1 data stream. At block 420, the AT receives second error control feedback relating to its second RL data stream (RL2).

The first and second error control messages may be sent to the AT on the forward link using corresponding MAC index values. For example, feedback relating to RL1 transmissions may be sent using MAC index M1, feedback relating to RL2 transmissions may be sent using MAC index M2, etc. At block 430, the AT performs a first H-ARQ process based on the first error control feedback. Depending upon the feedback received, the AT may continue with its data transmission or retransmit one or more data blocks. At block 440, the AT performs a second H-ARQ process based on the second error control feedback. Note that the AT may perform a separate error control process for each of its RL data streams in response to error control messages from the base station.

Figure 4B:
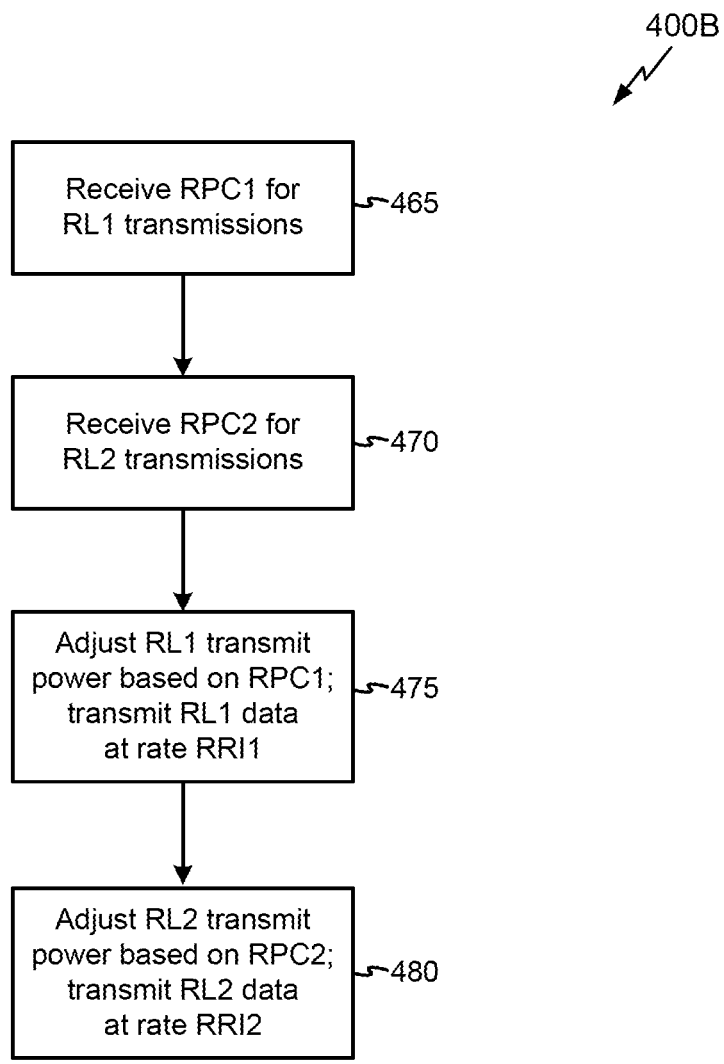
FIG. 4B shows an exemplary power control process.

FIG. 4B shows an exemplary power control process 400B such as may be used with reverse link MIMO data transmission. Process 400B may be performed by an access terminal, such as the access terminal 250, together with, or separately from, error control process 400A.

When data is exchanged between a base station and an access terminal, reverse link transmit power may be adjusted according to prevailing conditions. In reverse link MIMO mode, the access terminal can adjust a transmit power level for each of its reverse link data streams separately based on feedback from the base station. At block 465, the AT receives a first reverse power control command RPC1 from a base station. The RPC1 message can relate to the transmit power level of the first reverse link data stream RL1 and may, for example, indicate that RL1 transmit power should be increased, decreased, or maintained at its current level. At block 470, the AT receives a second reverse power control command RPC2 relating to the transmit power of its second RL data stream RL2, etc. As with error control in the H-ARQ processes, the RPC messages may be directed to the AT using MAC index values corresponding to each of its RL data streams.

The data rate of RL transmissions may be affected by a number of factors including transmit power, channel conditions, mobility of the access terminal, location of the AT within a cell-sector, etc. For example, more transmit power may be required to maintain a specified data rate when the AT is located at cell-edge than when the AT is near to a base station. As a result, the AT can determine a data rate independently for each of its RL data streams. At block 475, the AT determines a first data rate for RL1. At block 480, the AT determines a second data rate for RL2. Each data rate may be indicated to the AN by a corresponding reverse rate indicator RRI which the AT adds to the RL data stream. As shown at block 475, after adjusting the transmit power according to RPC1, the AT signals to the AN that RL1 is transmitted with data rate RRI1. Similarly, at block 480, the AT adjusts the transmit power of RL2 and signals to the AN that RL2 is transmitted with data rate RRI-2.

Figure 5:
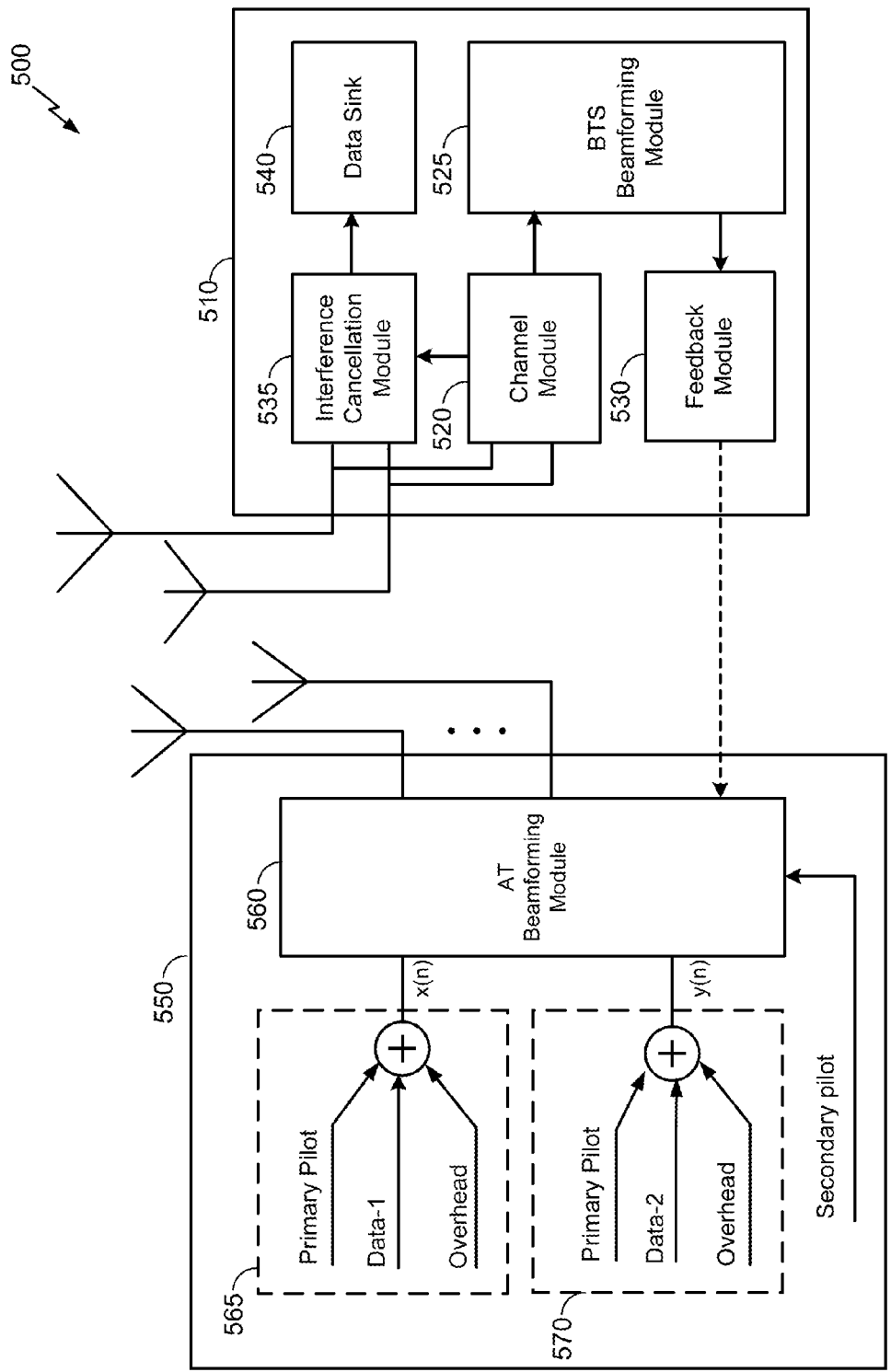
FIG. 5 shows a block diagram of a base station and an access terminal.

FIG. 5 shows an exemplary system 500 including an access terminal 550 and a base station 510 which cooperate to perform beamforming for reverse link data transmission. Base station 510 and access terminal 550 can be similar to the base station 210 and the access terminal 250 as described in connection with FIG. 2.

Access terminal 550 is shown with two RL data streams, including a first stream 565 and a second stream 570. Streams 565, 570 comprise a multiplex of signals including a primary pilot, data, and overheard information which are communicated to a beamforming module 560 as x(n) and y(n), respectively. In the present example, AT beamforming module 560 adds a secondary pilot to the first stream 565 which is orthogonal to the primary pilot to assist base station 510 in estimating the channel. The first and second streams may have different long code masks, different Walsh codes, and different orthogonal spreading.

Figure 6:
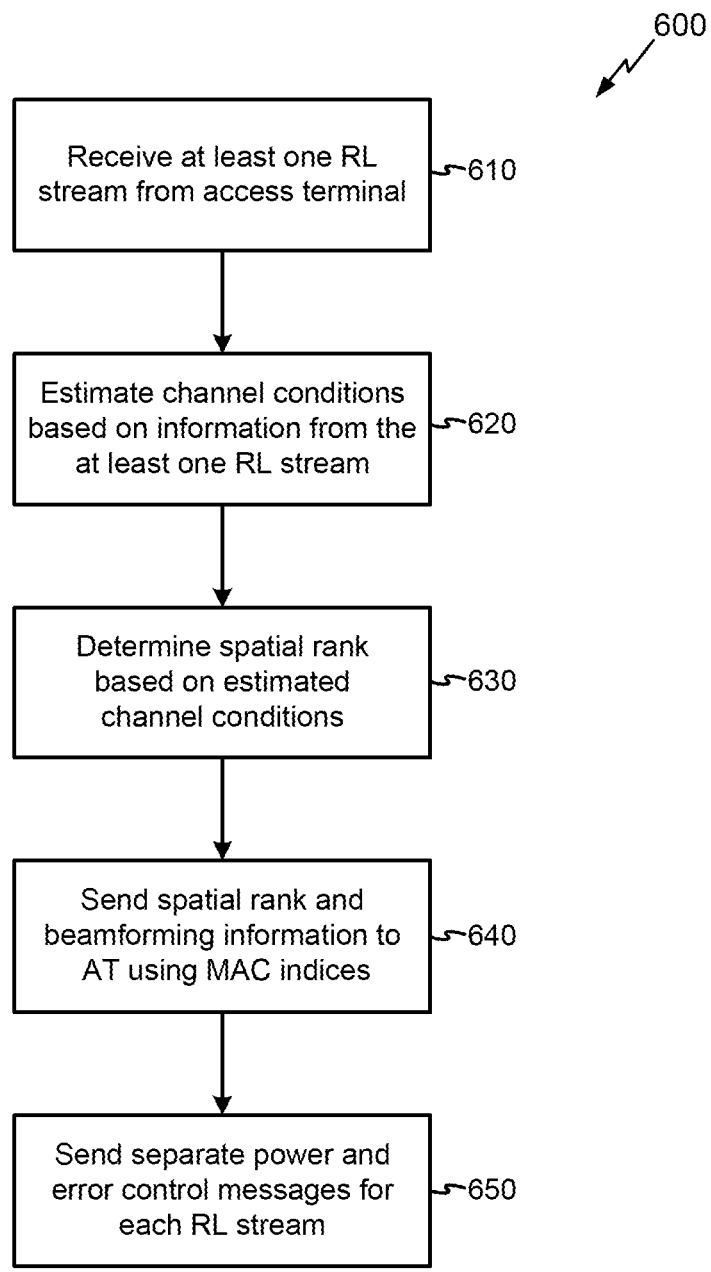
FIG. 6 shows a rank adaptation process used with reverse link data transmission.

Base station 510 is shown as including a channel module 520, a BTS beamforming module 525, a feedback module 530, an interference cancellation module 535, and a data sink 540. A closed-loop MIMO operation of base station 510 is now described with reference to the process 600 of FIG. 6.

At block 610, channel module 520 receives at least the first RL data stream 565 from access terminal 550. At block 620, channel module 520 estimates the rank of the MIMO channel using information obtained from the primary and secondary pilots. In the present example, both pilots are included with the same RL stream to ensure that they are transmitted at the same power level. This approach facilitates channel estimation since, as discussed in connection with FIG. 4B, each of the RL data streams 565, 570 may be power-controlled independently.

At block 630, channel module 520 evaluates the performance of different channel rankings and determines a spatial rank for communicating with the access terminal 550. The spatial rank may be selected according to performance-based criteria. For instance, performance may be quantified by a measure such as channel capacity, throughput, signal quality, etc. Channel module 520 may select a spatial rank that increases the performance metrics in relation to other possibilities and may, in some embodiments, gather information about signal quality, such as signal-to-noise ratio (SNR), signal-to-noise-and-interference ratio (SINR), energy-per-symbol-to-noise ratio (Es/No), and the like.

BTS beamforming module 525 determines beamforming ("steering") vectors corresponding to the estimated channel rank. The beamforming vectors may be computed based on channel response information from channel module 520. As an alternative, the beamforming vectors may be retrieved from a codebook shared by the base station and access terminal. The codebook may have a number of entries which correspond to predefined beams. Each steering vector or codebook entry may include a weight (power) and phase for multiple-antenna data transmission.

With two antennas, for example, the vector [1,1] specifies that the second antenna uses the same phase as the first antenna in beamforming. The [1,−1] vector means that the phase of the second antenna is 180 degrees shifted from the first antenna. The vectors may be complex values for which imaginary number, j, indicates a relative phase shift of ninety degrees, and a negative j indicates a relative phase shift of 270 degrees. Antenna selection vectors ([0,1], [1,0]) may be included alternatively to, or in addition to, beamforming vectors as a way of enabling or disabling use of a particular antenna.

At block 640, feedback module 530 transmits spatial rank and beamforming information to access terminal 550. Base station 510 may provide beamforming vectors for each antenna to be used for multiple-antenna transmission. Alternatively, base station 510 may provide beamforming vectors for a first antenna only and access terminal 550 may compute or retrieve additional beamforming vectors. For instance, with two antennas, beamforming module 525 may compute beamforming vectors for a first antenna, and access terminal 550 may determine one or more orthogonal beamforming vectors for data transmitted using the second antenna. Alternatively, beamforming module 525 may select one or more codebook entries and base station 510 may send indices for selected entries to the access terminal 550.

Feedback module 530 may add the spatial rank and beamforming information to packets destined for the access terminal 550 using its assigned MAC index values. In one example, feedback module inserts beamforming and spatial rank information into a beamforming feedback channel (BFFC) on the forward link. The BFFC may be transmitted in 1 or 2 slots for every 4 slots assigned for use by the access terminal 550. In some cases, existing FL channels may be used to carry BFFC information. For example, with EV-DO networks, the Reverse Power Control (RPC) channel, the DRC LOCK channel (a control channel), and/or the ARQ channel (used to carry ACK/NACK signals) may be punctured with channel state/steering vector indices to be sent to the access terminal 550. The amount of information carried by the BFFC (e.g., the number of bits) and the rate at which updates are provided may vary according to channel conditions or conditions at the access terminal. For example, the frequency at which updates are provided may increase with increasing mobility of the access terminal and/or deteriorating channel conditions.

At block 650, base station 510 sends power control and/or error control messages in response to each RL data stream from the access terminal 550, as these operations are described in connection with FIG. 4A and FIG. 4B.

Figure 7:
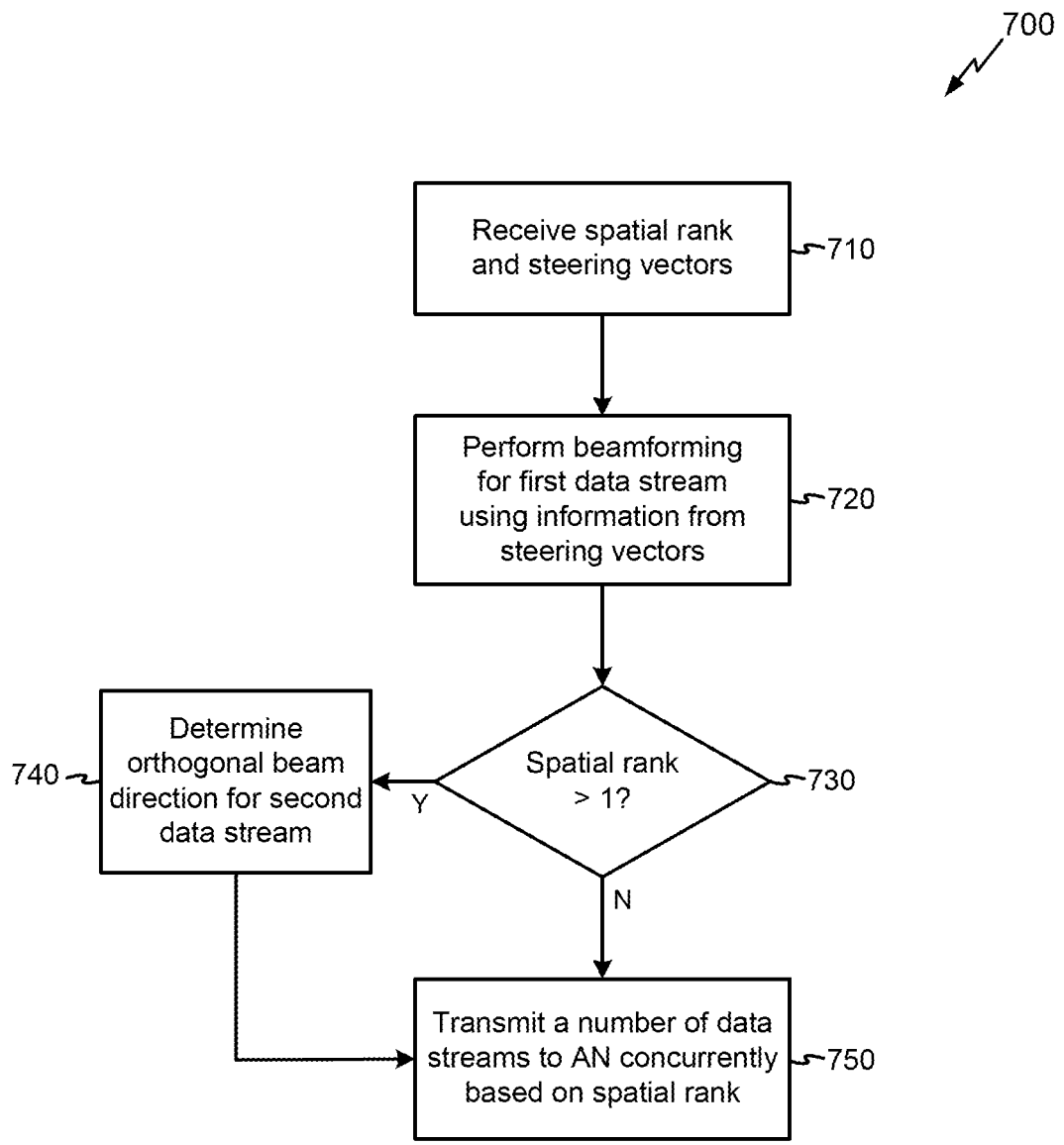
FIG. 7 shows a process for data transmission in a closed-loop MIMO system.

A closed-loop MIMO operation of access terminal 550 is now described with reference to the process 700 of FIG. 7. Process 700 may be performed by access terminal 550 in system 500 as shown in FIG. 5.

At block 710, access terminal 550 receives spatial rank and beamforming information from base station 510. The spatial rank may indicate how many data streams 565, 570 may be transmitted concurrently on the reverse link. For instance, in the present example, MIMO operation may be indicated by a spatial rank of two, and single-stream transmit diversity mode may be indicated by a spatial rank of one. The beamforming information may include steering vectors or codebook entries for determining a weight, phase, and antenna selection to be used for corresponding RL data streams.

At block 720, beamforming module 560 uses the beamforming information to create steerable beams for transmitting the first data stream 565 with a selection of first and second selected antennas. If the spatial rank is more than one, block 730, beamforming module 560 determines beamforming parameters for transmitting second data stream 570. In some embodiments, the beamforming parameters for the second data stream 570 are computed or otherwise derived from the beamforming information received from base station 510 for the first data stream 565. For instance, at block 740, access terminal 550 may compute a beam direction for the second data stream 570 that is orthogonal to the beam direction specified by base station 510 for the first data stream 565.

At block 750, the access terminal 550 transmits a number of data streams concurrently on the reverse link. The number of streams may be determined by the spatial rank and each stream may be transmitted at a power level and with error control as determined by feedback from the base station.

Figure 8:
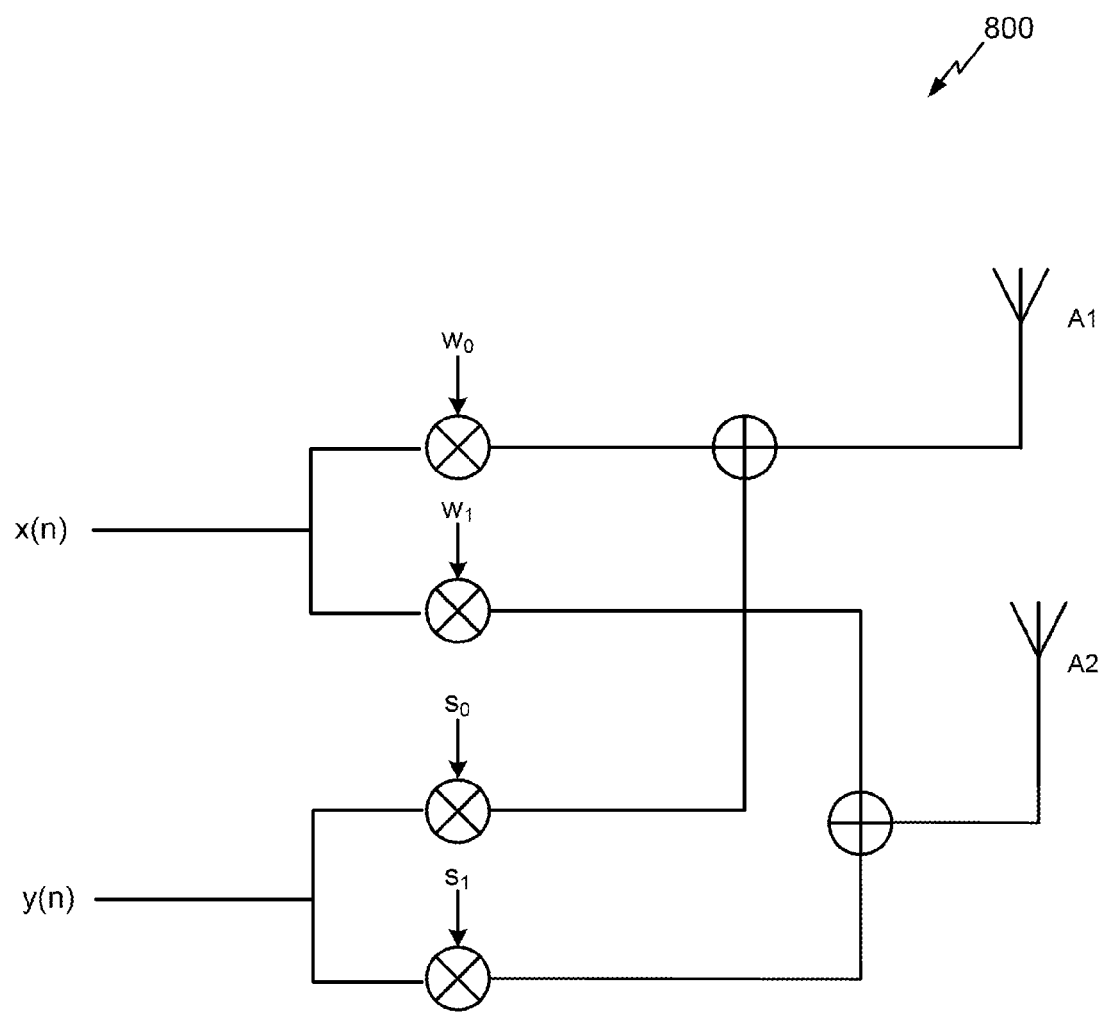
FIG. 8 shows aspects of beamforming and antenna selection.

FIG. 8 presents aspects of beamforming 800 relating to an exemplary operation of AT beamforming module 560. As illustrated, beamforming module 560 receives signals x(n) and y(n) corresponding to the first stream 565 and the second stream 570, respectively. Beamforming parameters (w0, w1), are applied to signal x(n) and beamforming parameters information (s0, s1) may also be applied to signal y(n). As noted previously, the beamforming parameters may include weight/phase information for transmitting each stream with the selection of antennas.

If the spatial rank is two, beamforming module 560 combines the RL streams 565, 570 at each of the selected transmit antennas A1, A2. On the other hand, if the spatial rank is one, only the first stream 565 is transmitted using the selected antennas. For example, transmission of second stream 570 may be disabled in the single-stream transmit diversity mode by setting $s_0 = s_1 = 0$. AT beamforming module 560 could also switch to single-antenna transmission of x(n) by setting $w_1 = 0$.

When receiving multiple RL data streams from an access terminal, base station 510 may employ interference canceling techniques. As shown in FIG. 5, base station 510 includes an interference cancellation module 535 coupled to a data sink 540. Interference cancellation module 535 may cancel or null the interference from a first data stream before a second transmit stream is decoded. In one example, interference cancellation module 535 decodes the first transmit stream 565, determines its contribution to the received signal based on channel information from channel module 520, and then subtracts the contribution of the first data stream 565 from the received signal before the second data stream 570 is decoded. By successively removing the contribution of other streams, the signal-to-noise ratio can be increased and it may be possible to support higher data rates.

The various illustrative logical blocks, modules, circuits, and algorithm steps described in connection with the disclosure herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative logical blocks, modules, and circuits described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of communicating in an Evolution Data Optimized (EV-DO) network performed by an access terminal having a plurality of antennas, the method comprising:
   determining a number of reverse link data streams to transmit;
   determining a selection of antennas from the plurality of antennas for transmitting the reverse link data streams;
   determining beamforming parameters based at least in part on a beamforming identifier;
   transmitting a first data stream comprising a first medium access control (MAC) index using the selection of antennas, the first data stream being transmitted via the selection of antennas in accordance with the beam-forming parameters; and
   transmitting a second data stream comprising a second MAC index, the second data stream being transmitted in response to determining that the number of reverse link data streams is at least two, the second data stream being transmitted concurrently with the first data stream, and the second data stream being transmitted via the selection of antennas using a beam direction that is orthogonal to a beam direction of the first data stream.

2. The method of claim 1, wherein determining the number of reverse link data streams comprises receiving feedback from a base station.

3. The method of claim 1, wherein determining the number of reverse link data streams comprises testing one or more multiple-antenna hypotheses of the access terminal.

4. The method of claim 1, further comprising:
   transmitting a single data stream to the EV-DO network using a pair of antennas in the plurality of antennas responsive to determining that the number of reverse link data streams is one.

5. The method of claim 1, further comprising:
   receiving the beamforming identifier from the EV-DO network.

6. The method of claim 5, further comprising:
   transmitting the first data stream with a first phase using a first antenna and with a second phase using a second antenna based on the beamforming information.

7. The method of claim 1, in which:
   the first data stream is transmitted to the EV-DO network using first and second antennas in the plurality of antennas; and
   the second data stream is transmitted with the first and second antennas.

8. The method of claim 1, further comprising:
   receiving from the EV-DO network a first power control message;
   receiving from the EV-DO network a second power control message;
   determining a first power level for transmitting the first data stream based on the first power control message; and
   determining a second power level for transmitting the second data stream based on the second power control message.

9. The method of claim 1, further comprising:
   receiving from the EV-DO network a first error control message relating to the first data stream;
   receiving from the EV-DO network a second error control message relating to the second data stream;
   performing a first error control process for the first reverse link data stream based on the first error control message; and
   performing a second error control process for the second reverse link data stream based on the second error control message.

10. The method of claim 1, wherein the first data stream comprises a first pilot signal and a second pilot signal orthogonal to the first pilot signal, and wherein the second data stream is transmitted absent the second pilot signal.

11. The method of claim 1, further comprising:
    transmitting the first data stream at a first data rate; and
    transmitting the second data stream at a second data rate.

12. The method of claim 11, wherein the first data stream comprises a first indicator of the first data rate and the second data stream comprises a second indicator of the second data rate.

13. An Evolution Data Optimized (EV-DO)-enabled access terminal, the access terminal comprising:
    a plurality of antennas;
    a plurality of transceivers, wherein each transceiver is coupled to a corresponding antenna in the plurality of antennas; and
    a controller coupled to the transceivers and configured:
      to determine beamforming parameters based at least in part on a beamforming identifier;
      to determine a number of reverse link data streams to transmit,
      to determine a selection of antennas from the plurality of antennas for transmitting the reverse link data streams,
      to transmit a first data stream comprising a first medium access control (MAC) index, the first data stream being transmitted via the selection of antennas in accordance with the beam-forming parameters, and
      to transmit a second data stream comprising a second MAC index the second data stream being transmitted in response to determining that the number of reverse link data streams is at least two, the second data stream being transmitted concurrently with the first data stream, and the second data stream being transmitted via the selection of antennas using a beam direction that is orthogonal to a beam direction of the first data stream.

14. The access terminal of claim 13, wherein the controller is configured to determine the number of reverse link data streams based on feedback from a base station.

15. The access terminal of claim 13, wherein the controller is configured to determine the number of reverse link data streams based on a result of testing one or more multiple-antenna hypotheses of the access terminal.

16. The access terminal of claim 13, wherein the first data stream comprises a first pilot and a second pilot orthogonal to the first pilot.

17. The access terminal of claim 13, wherein the controller is configured to receive the beamforming identifier from the EV-DO network.

18. The access terminal of claim 13, wherein the controller is configured to detect in transmissions from the EV-DO network a first power control message and a second power control message, and to determine a power level for transmitting the first data stream based on the first power control message and a power level for transmitting the second data stream based on the second power control message.

19. The access terminal of claim 13, wherein the controller is configured to detect in a forward link signal a first error control message relating to the first data stream and a second error control message relating to the second stream, and to perform a first error control process for the first data stream based on the first error control message, and a second error control process for the second data stream based on the second error control message.

20. An Evolution Data Optimized (EV-DO)-enabled access terminal, comprising:
means for determining a number of reverse link data streams to transmit;
means for determining a selection of antennas from a plurality of antennas for transmitting the reverse link data streams;
means for determining beamforming parameters based at least in part on a beamforming identifier;
means for transmitting a first data stream comprising a first medium access control (MAC) index, the first data stream being transmitted via the selection of antennas in accordance with the beam-forming parameters; and
means for transmitting a second data stream comprising a second MAC index, the second data stream being transmitted in response to determining that the number of reverse link data streams is at least two, the second data stream being transmitted concurrently with the first data stream, and the second data stream being transmitted via the selection of antennas using a beam direction that is orthogonal to a beam direction of the first data stream.

21. The access terminal of claim 20, wherein the means for determining the number of reverse link data streams to transmit comprise means for receiving feedback from a base station.

22. The access terminal of claim 20, wherein the means for determining the number of reverse link data streams to transmit comprise means for testing one or more multiple-antenna hypotheses of the access terminal.

23. The access terminal of claim 20, further comprising:
means for transmitting a single data stream to the EV-DO network using a pair of antennas selected from the plurality of antennas in response to the number of reverse link data streams being one.

24. The access terminal of claim 20, further comprising:
means for receiving the beamforming identifier from the EV-DO network.

25. The access terminal of claim 20, in which:
the first data stream is transmitted to the EV-DO network using first and second antennas in the plurality of antennas; and
the second data stream is transmitted with the first and second antennas.

26. The access terminal of claim 20, further comprising:
means for receiving a first power control message;
means for receiving a second power control message;
means for determining a power level for transmitting the first data stream based on the first power control message; and
means for determining a power level for transmitting the second data stream based on the second power control message.

27. The access terminal of claim 20, further comprising:
means for receiving a first error control message relating to the first data stream;
means for receiving a second error control message relating to the second data stream;
means for performing a first error control process for the first data stream based on the first error control message; and
means for performing a second error control process for the second data stream based on the second error control message.

28. The access terminal of claim 20, further comprising:
means for transmitting the first data stream at a first data rate; and
means for transmitting the second data stream at a second data rate.

29. A computer program product comprising:
a processor-readable medium storing non-transitory processor-readable instructions for use with an access terminal in an Evolution Data Optimized (EV-DO) network, wherein the instructions are configured to cause a processor to:
determine a number of reverse link data streams to transmit;
determine a selection of antennas from a plurality of antennas for transmitting the reverse link data streams;
determine beamforming parameters based at least in part on a beamforming identifier;
transmit a first data stream comprising a first medium access control (MAC) index, the first data stream being transmitted via the selection of antennas in accordance with the beam-forming parameters; and
transmit a second data stream comprising a second MAC index, the second data stream being transmitted in response to determining that the number of reverse link data streams is at least two, the second data stream being transmitted concurrently with the first data stream, and the second data stream being transmitted via the selection of antennas using a beam direction that is orthogonal to a beam direction of the first data stream.

30. The computer program product of claim 29, wherein the instructions are configured to determine the number of reverse link data streams to transmit based on feedback from a base station.

31. The computer program product of claim 29, wherein the instructions are configured to determine the number of reverse link data streams to transmit based on a result of testing one or more multiple-antenna hypotheses of the access terminal.

32. The computer program product of claim 29, wherein the instructions are configured to cause the processor to transmit a single data stream to the EV-DO network using a pair of antennas selected from the plurality of antennas in response to the number of reverse link data streams being one.

33. The computer program product of claim 29, wherein the instructions are configured to cause the processor to receive the beamforming identifier.

34. The computer program product of claim 29, wherein the instructions are configured to cause the processor to:
transmit the first data stream to the EV-DO network using first and second antennas; and
transmit the second data stream with the first and second antennas.

35. The computer program product of claim 29, wherein the instructions are configured to cause the processor to:
receive first power control information;
receive second power control information;
determine a first power level for transmitting the first data stream based on the first power control information; and
determine a second power level for transmitting the second data stream based on the second power control information.

* * * * *